United States Patent Office 3,248,380
Patented Apr. 26, 1966

3,248,380
METHOD OF OXIDIZING ALCOHOLS
John G. Moffatt, Palo Alto, Calif., and Klaus E. Pfitzner, Gottingen, Germany, assignors to Syntex Corporation, Panama, Panama, a corporation of Panama
No Drawing. Filed Oct. 7, 1963, Ser. No. 316,198
20 Claims. (Cl. 260—211.5)

This invention relates to a novel method of oxidizing alcohols to the corresponding aldehydes or ketones. More particularly, this invention relates to a general method of oxidizing, under relatively mild conditions, primary alcohols to the corresponding aldehydes and secondary alcohols to the corresponding ketones. Briefly stated, this method comprises reacting the alcohol starting material, under substantially anhydrous conditions, with a carbodiimide, e.g., an N,N'-di(hydrocarbon substituted) carbodiimide, preferably an N,N'-dialkyl (including cycloalkyl) carbodiimide, in a hydrocarbon sulfoxide, e.g., dimethylsulfoxide, in the presence of an acid catalyst.

Any primary alcohol, i.e., R—$CH_2OH$, or secondary alcohol, i.e.,

can be oxidized by the process of the present invention to the corresponding aldehyde, i.e., R—CHO, or ketone, i.e.,

In the above formulas, R can represent hydrogen or an aliphatic, alicyclic, aromatic or heterocyclic group, while R' and $R^2$ can each represent an aliphatic, alicyclic, aromatic or heterocyclic group.

Included among the aliphatic, alicyclic and aromatic groups which R, R' and $R^2$ can represent are alkyl (including saturated and unsaturated, straight and branched-chain alkyl and cycloalkyl) and aryl (including alkaryl and aralkyl) groups, such as methyl, ethyl, propyl, isopropyl, n-butyl, sec-butyl, amyl hexyl, heptyl, octyl, allyl, methallyl, cyclobutyl, cyclopentyl, cyclohexyl, methylcyclohexyl, cycloheptyl, cyclohexenyl, phenyl, tolyl, xylyl, benzyl, and the like, as well as fused ring structures, such as indanyl, indenyl, naphthyl, acenaphthyl, phenanthryl, and cyclopentanopolyhydrophenanthryl rings, and the like, all of which can either be unsubstituted or substituted with one or more non-interfering substituents, e.g., tertiary hydroxyl groups; hydroxyl derivatives, such as alkoxy, e.g., methoxy, and acyloxy, e.g., acetoxy groups; nitro groups; amino groups; alkylamino groups, such as methylamino, dimethylamino and diethylamino groups; halogens, e.g., fluorine or chlorine; carbonyl derivatives, such as enol ether and ketal groups, and the like.

Included among the heterocyclic groups which can be represented by R, R' and/or $R^2$ are substituted and unsubstituted furfuryl groups, tetrahydrofurfuryl groups, piperidyl groups, pyrrolidyl groups, pyridyl groups, thiophene groups, and alkaloid nuclei groupings, containing, for example, indole, dihydroindole, quinuclidine, and quinolin groupings, and the like. Furthermore, where R in the general formula R—$CH_2OH$ given above for a primary alcohol represents a particular class of hydroxy-substituted tetrahydrofurfuryl groups, i.e., those having the structure:

wherein $R^3$ represents a substituted or unsubstituted purine or pyrimidine base, e.g., purine, pyrimidine, adenine, guanine, uracil, cytosine, thymine, 6-azauracil, 8-azaguanine, and the like; $R^4$ represents hydrogen, amino, alkylamino, such as methylamino, ethylamino, dimethylamino and diethylamino, thiol, alkylthio, such as methylthio and ethylthio; $R^5$ represents an acyloxy or alkoxy group, and $R^4$ and $R^5$ taken together represent an acetal or ketal group, e.g., isopropylidenedioxy and the like, the starting material is a nucleoside, i.e.:

and will be converted, by the process of the present invention, to the corresponding aldehyde, i.e.:

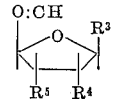

$R^3$, $R^4$ and $R^5$ in these formulas having the meanings just given hereinabove. Among the nucleoside starting materials represented by this general formula are adenosine, cytidine, guanosine, thymidine, uridine, deoxyadenosine, deoxycytidine, deoxyguanosine, 6-azauridine, 8-azaguanosine, and the like. Also included among the nucleoside alcohols which can be oxidized to the corresponding aldehydes by the process of the present invention are those containing sugars other than ribose or 2-deoxyribose.

As previously indicated, the carbodiimide, e.g., an N,N'-di(hydrocarbon substituted) carbodiimide, employed as part of the oxidizing system of the present invention is preferably an N,N'-dialkyl (including cycloalkyl) carbodiimide, such as N,N'-dimethylcarbodiimide, N,N'-di-n-propylcarbodiimide, N,N'-diisopropylcarbodiimide, N,N'-dibutylcarbodiimide, N,N'-dicyclohexylcarbodiimide, N, N'-di(methylcyclohexyl) carbodiimide, and the like. However, N,N'-diarylcarbodiimides, such as N,N'-di-p-tolylcarbodiimide and the like, and N-alkyl-N'-arylcarbodiimides, such as N-(4-pyridylmethyl)-N'-cyclo-hexylcarbodiimide [which can be prepared by the condensation of cyclohexylisothiocyanate and 4-aminomethylpyridine followed by desulfurization with sodium hypochlorite or mercuric oxide, and which is especially suitable for use when oxidizing water-insoluble compounds, e.g., steroidal alcohols, inasmuch as this carbodiimide, and the N-(4-pyridylmethyl)-N'-cyclohexylurea obtained therefrom during the oxidation reaction, can be readily extracted with mild acid], and the like, can also be used, if desired, although somewhat longer reaction times and lower yields result when carbodiimides other than the N,N'-dialkylcarbodiimides are used. In fact, the fastest reaction times and highest yields, all other factors being held constant, have been observed when using N,N'-dicyclohexylcarbodiimide. The amount of carbodiimide employed can range from about 1 to about 10 molar equivalents, and preferably from about 3 to about 8 molar equivalents, per molar equivalent of the alcohol being oxidized.

A hydrocarbon sulfoxide, e.g., dimethylsulfoxide, diethylsulfoxide, tetramethylenesulfoxide, and the like, which is a liquid at the temperature at which the oxidation reaction is carried out, can be employed as the sole solvent for the reaction or it can be admixed with one or more mutually compatible inert organic solvents, such as benzene, toluene, xylene, dioxane, ethyl acetate, and the like. In this latter case the amount of hydrocarbon sulfoxide present in the solvent mixture will be at least about 10%, and preferably at least about 50% by volume, of the entire solvent mixture. The preferred solvent, whether used alone or in admixture with another solvent or solvents, is dimethylsulfoxide.

The total amount of solvent employed is primarily dependent on the solubility of the alcohol being oxidized. In general, however, solutions containing from about 1% to about 30% by weight of the alcohol being oxidized have been found to be especially suitable.

The acid catalyst employed can be any organic or inorganic acid, or a salt thereof, which will provide an acidic reaction medium. Acidic substances such as the oxyacids of phosphorus, e.g., phosphoric acid, phosphorous acid, hypophosphorous acid, and the like, phosphorus acid derivatives, e.g., acid phosphates such as monophenylphosphate, diphenylphosphate, and the like, as well as other relatively strong acids and acids of intermediate strength, e.g., p-toluenesulfonic acid, trifluoroacetic acid, and the like, and amine salts, such as the pyridine salts of hydrochloric, sulfuric, perchloric orthophosphoric and trifluoroacetic acids, and the like, have proven to be especially suitable, while mineral acids per se, e.g., hydrochloric, sulfuric and perchloric acids, and the like, have been found to be less suitable than, for example, the aforementioned oxyacids of phosphorus. The amount of acid catalyst employed is not critical except insofar as increases or decreases in yields or in the rate of reaction are concerned (e.g., see Examples XXVI–XXIX, infra), since it is only necessary that the amount used be sufficient to render the reaction medium acidic, and thus can be varied to a considerable extent, depending on such factors as those mentioned hereinabove as well as on the particular acidic substance or substances used, the alcohol being oxidized, the carbodiimide employed, and the like. However, a preferred range of amounts, especially where an acid or amide salt of intermediate strength is employed, e.g., phosphoric acid, pyridinium hydrochloride, and the like, will be from about 0.01 molar equivalent to about 5 molar equivalents, and more particularly from about 0.5 to about 1 molar equivalent, per molar equivalent of the alcohol being oxidized.

The reaction will be carried out under substantially anhydrous conditions, i.e., at as low a moisture content as can be practicably achieved. Thus, the reactants, solvent and catalyst will be rendered substantially anhydrous, i.e., substantially all water which is not chemically bound will be removed therefrom, before they are admixed. Procedures which can be employed to dry the reactants, solvent and catalyst are well known in the art. For example, one relatively simple method of drying a liquid hydrocarbon sulfoxide to a relatively low moisture content, e.g., a moisture content of from about 1 part to about 10 parts per million of water by weight, based on the total weight of the sulfoxide, merely involves contactnig the sulfoxide with a molecular sieve, such as Linde Type 4A or 10X (which are commercially available beads or pellets of alkali metal aluminosilicates), for from about 3 days to about 7 days at a temperature of from about 20° C., to about 30° C. Similarly, the alcohol and the carbodiimide can be refluxed under vacuum with from about 100 to about 200 times their weight of anhydrous pyridine to render them substantially anhydrous.

The procedure which we prefer to follow in carrying out the process of the present invention consists of adding the acid catalyst to a solution of the alcohol starting material and the carbodiimide in either dimethylsulfoxide or a mixture of dimethylsulfoxide and one or more different inert solvents. However, with the exception that since the acid catalyst and the carbodiimide can usually co-react, they should not be admixed, in most cases, prior to the addition of the alcohol and the solvent to one or the other of them, other variations in the order of addition of the reactants, as well as the use of amounts of reactants, solvents and catalysts differing from those given hereinabove, are well within the scope of the present invention.

Similarly, our novel oxidation process can be carried out at a temperature of from about 10° C. to about 100° C., and preferably at from about 20° C., to about 30° C. or about room temperature, for periods of time ranging from about 30 minutes to about 48 hours, depending for the most part on the nature of the alcohol being oxidized and the acid catalyst. Here too, however, higher or lower reaction temperatures coupled with shorter or longer reaction times can be employed, if desired.

In order that those skilled in the art can more fully understand the present invention, the following examples are set forth. These examples are given solely for purposes of illustration, and should not be considered as expressing limitations unless so set forth in the appended claims. All parts and percentages are by weight, unless otherwise stated.

*Example I*

To a substantially anhydrous solution of 1 mmole (millimole) of 3'-O-acetylthymidine in 3 ml. of dimethylsulfoxide, contained in a suitable reaction vessel, there was added 0.5 mmole of substantially anhydrous orthophosphoric acid and 3 mmoles of substantially anhydrous N,N'-dicyclohexylcarbodiimide. The resulting reaction mixture was maintained at room temperature (about 25° C.) for 4 hours, then another mmole of substantially anhydrous N,N'-dicyclohexylcarbodiimide was added. After 4 more hours at room temperature, a final mmole of substantially anhydrous N,N'-dicyclohexylcarbodiimide was added, and the reaction mixture was then allowed to stand at room temperature for an additional 10 hours, resulting in a 90% yield (as estimated by paper chromatography) of 3'-O-acetylthymidine-5'-aldehyde.

The dimethylsulfoxide was then evaporated under vacuum and the residue was extracted with petroleum ether to remove unreacted N,N'-dicyclohexylcarbodiimide. The product was isolated both as the noncrystalline free aldehyde and its crystalline 2,4-dinitrophenylhydrazone (melting point 232–234° C., $\lambda$max. (EtOH) 350 m$\mu$;261 m$\mu$, $\epsilon$max. 21400; 19300). The free aldehyde was further characterized by reduction with NaBH$_4$ (with hydrolysis of the acetyl group) to thymidine, and by oxidation with hypoiodite to 3'-O-acetylthymidine-5'-carboxylate.

*Example II*

The procedure of Example I was repeated in every detail but one, namely, 3'-O-acetylthymidine was replaced by 2', 3'-O-isopropylideneadenosine. A good yield of 2',3'-isopropylideneadenosine-5'-aldehyde was obtained. Mild acidic hydrolysis of this product, carried out in 10% aqueous acetic acid at 100° C., for an hour, gave adenosine-5'-aldehyde, which was chromatographically identical to the irradiation product of Vitamin B–12 coenzyme (cf. Hogenkamp et al., J. Biol Chem., 237, 1959, 1962).

*Examples III and IV*

The procedure of Example I was again repeated in every detail in each of these examples with the following exceptions: 3'-O-acetylthymidine was replaced by cholestanol and cholesterol, respectively. Good yields of cholestan-3-one (melting point 129° C.; isolated in 68% yield by silicic acid chromatography) and Δ⁵-cholesten-3-one were obtained.

Example V

To a substantially anhydrous solution of 1 mmole of p-nitrobenzyl alcohol in 1 ml. of dimethylsulfoxide, contained in a suitable reaction vessel, there was added 0.5 mmole of substantially anhydrous orthophosphoric acid and 5 mmoles of substantially anhydrous N,N'-dicyclohexyl-carbodiimide. The resulting reaction mixture was maintained at room temperature for 30 minutes, resulting in the substantially quantitative formation of p-nitrobenzaldehyde, which was isolated both as the crystalline 2,4-dinitrophenylhydrazone and as the semicarbazone.

Examples VI–X

The procedure of Example V was repeated in each of these examples in every detail, except for the following. First of all, p-nitrobenzyl alcohol was replaced by propanol-1, butanol-2, pentanol-3, n-octanol-1 and cyclohexanol, respectively. Secondly, the reaction times were varied between 1 and 12 hours. Finally, in Examples VI and VII, dimethylsulfoxide was replaced by diethylsulfoxide and tetramethylenesulfoxide, respectively. In each case, the corresponding aldehyde or ketone, namely, propionaldehyde, methyl ethyl ketone, diethylketone, n-octanal and cyclohexanone, respectively, was obtained.

Example XI

To a substantially anhydrous solution of 0.3 mmole of testosterone and 0.9 mmole of N,N'-dicyclohexylcarbodiimide in 1.5 ml. of dimethylsulfoxide, contained in a suitable reaction vessel, there was added 0.15 mmole of substantially anhydrous orthophosphoric acid. The resulting reaction mixture was maintained at room temperature for 2 hours, then 0.3 mmole of substantially anhydrous N,N'-dicyclohexylcarbodiimide was added. After allowing the reaction mixture to stand at room temperature for another hour, a 0.5 ml. aliquot portion was removed therefrom and evaporated to dryness under vacuum. The resulting residue was separated by thin layer chromatography on Silica G. (E. Merck A. G., Germany) in the system chloroform: ethyl acetate (4:1), and quantitatively determined by elution with methanol and examination of the ultraviolet spectra. It was found that Δ⁴-androstene-3,17-dione (melting point 169–170° C.;

$$\lambda_{max.}^{MeOH}\ 240\ m\mu,\ \epsilon\ max.\ 16{,}000)$$

had been obtained in 94% yield.

After standing for an additional 2 hours at room temperature, the reaction mixture was admixed with an additional 0.3 mmole of substantially anhydrous N,N'-dicyclohexylcarbodiimide. After the addition of the carbodiimide had been completed and the reaction mixture had been allowed to stand for a few minutes, another 0.5 ml. aliquot portion was removed therefrom and examined in the manner described hereinabove. It was found that Δ⁴-androstene-3,17-dione was now present in 95% yield. The reaction mixture was then allowed to stand for an additional 13 hours at room temperature but no increase in yield of product was observed.

Examples XII–XVIII

The procedure of Example XI was repeated in every detail in each of these examples with the following exceptions. In Example XII, substantially anhydrous phosphorous acid was the catalyst; in Example XIII, substantially anhydrous trifluoroacetic acid. In Examples XIV–XVIII, the pyridine salts of orthophosphoric, hydrochloric, sulfuric, perchloric and trifluoroacetic acids, respectively, were employed as the acid catalysts, and were formed in situ by adding 0.3 mmole of substantially anhydrous pyridine to the reaction mixture before adding the acid. In all cases, Δ⁴-androstene-3,17-dione was formed, and the percent yields obtained after 3, 5 and 18 hours reaction time are given in Table I below:

TABLE I

| Example | Acid catalyst | Reaction time [1] | Percent |
|---|---|---|---|
| XII | H₃PO₃ | 3 | 92 |
| XII | H₃PO₃ | 5 | 92 |
| XII | H₃PO₃ | 18 | 96 |
| XIII | TFA [2] | 3 | 13 |
| XIII | TFA [2] | 5 | 16 |
| XIII | TFA [2] | 18 | 18 |
| XIV | Py'H₃PO₄ [3] | 3 | 86 |
| XIV | Py'H₃PO₄ [3] | 5 | 94 |
| XIV | Py'H₃PO₄ [3] | 18 | 99 |
| XV | Py'HCl | 3 | 26 |
| XV | Py'HCl | 5 | -- |
| XV | Py'HCl | 18 | 87 |
| XVI | Py'H₂SO₄ | 3 | 13 |
| XVI | Py'H₂SO₄ | 5 | 27 |
| XVI | Py'H₂SO₄ | 18 | 73 |
| XVII | Py'HClO₄ | 3 | 20 |
| XVII | Py'HClO₄ | 5 | 36 |
| XVII | Py'HClO₄ | 18 | 62 |
| XVIII | Py'TFA | 3 | 54 |
| XVIII | Py'TFA | 5 | 77 |
| XVIII | Py'TFA | 18 | 100 |

[1] In hours.
[2] TFA=trifluoroacetic acid.
[3] Py=pyridine.

Example XIX

To a substantially anhydrous solution of 2 mmoles of N,N'-dicyclohexylcarbodiimide and 0.1 molar equivalent (relative to testosterone) of orthophosphoric acid dissolved in 2 ml. of a mixture of dimethylsulfoxide and benzene in a volume ratio of 3:7, respectively, contained in a suitable reaction vessel, there was added 0.4 mmole of testosterone. This reaction mixture was then allowed to stand at room temperature for 1 hour, at which point an 0.5 ml. aliquot portion was taken and examined in the manner described in Example XI. It was found that Δ⁴-androstene-3,17-dione had been obtained in 60% yield. Further aliquots taken after 3 and 22 hours reaction time at room temperature showed an increase in yield to 75% and 85%, respectively.

Examples XX–XXII

The procedure of Example XIX was repeated in every detail in each of these examples with one exception, namely, amounts of orthophosphoric acid corresponding to 0.5, and 1 and 2 molar equivalents (relative to testosterone) were used in place of the 0.1 molar equivalent employed in Example XIX. In all cases, Δ⁴-androstene-3,17-dione was formed, and the percent yields obtained after 1, 3 and 22 hours reaction time at room temperature are given in Table II below.

TABLE II

| Molar equiv. of H₃PO₄ | Percent yield | | |
|---|---|---|---|
| | 1 hour | 3 hours | 22 hours |
| 0.5 | 85 | 83 | 89 |
| 1 | 72 | 71 | 83 |
| 2 | 60 | 61 | 66 |

Example XXIII

To 0.6 mmole of testosterone dissolved in 3 ml. of a substantially anhydrous mixture of dimethylsulfoxide and benzene in a volume ratio of 1:3, respectively, contained in a suitable reaction vessel, there were added 0.15 mmole of anhydrous orthophosphoric acid and 1 molar equivalent (relative to testosterone) of N,N'-dicyclohexylcarbodiimide. This reaction mixture was then allowed to stand at room temperature for 1 hour, at which point a=0.5 ml. aliquot portion was taken and examined in the manner described in Example XI. It was found that Δ⁴-androstene-3,17-dione had been obtained in 7% yield. Further aliquots taken after 3, 6, and 24 hours reaction time at room temperature showed an increase in yield to 10%, 11% and 11%, respectively, indicating that the percent yield obtained could not be increased by reacting under these conditions beyond 6 hours.

*Examples XXIV and XXV*

The procedure of Example XXIII was repeated in each of these examples in every detail but one, namely, amounts of N,N'-dicyclohexylcarbodiimide corresponding to 2 and 3 molar equivalents (relative to testosterone) were used in place of the 1 molar equivalent employed in Example XXIII. In each case, $\Delta^4$-androstene-3,17-dione was formed, and the percent yields obtained after 1, 3, 6, and 24 hours reaction time at room temperature are given in Table III below.

TABLE III

| Molar equiv. of DCC [1] | Percent yield | | | |
|---|---|---|---|---|
| | 1 hour | 3 hours | 6 hours | 24 hours |
| 2 | 14 | 44 | 70 | 72 |
| 3 | 18 | 73 | 91 | 90 |

[1] DCC=N,N'-dicyclohexylcarbodiimide.

*Examples XXVI–XXIX*

The procedure employed in Example XXIII was again repeated in every detail with the following exceptions. The amounts of anhydrous orthophosphoric acid employed was raised to 0.3 mmole in all cases, and 1, 3, 5 and 8 molar equivalents (relative to testosterone), respectively, of N,N'-dicyclohexylcarbodiimide were used. In all cases, $\Delta^4$-androstene-3,17-dione was formed, and the percent yields obtained after 1 and 3 hours reaction time at room temperature are given in Table IV below.

TABLE IV

| Molar equiv. of DCC | Percent yield | |
|---|---|---|
| | 1 hour | 3 hours |
| 1 | 6 | 5 |
| 3 | 84 | 83 |
| 5 | 86 | 83 |
| 8 | 80 | 85 |

*Example XXX*

To a substantially anhydrous solution of 0.1 mmole of testosterone dissolved in 0.5 ml. of a mixture of dimethylsulfoxide and benzene in a volume ratio of 1:1 contained in a suitable reaction vessel, there were added 0.05 mmole of anhydrous orthophosphoric acid and 5 molar equivalents (relative to testosterone) of N,N'-diisopropylcarbodiimide. After standing at room temperature for 22 hours, the reaction mixture was chromatographically separated and was found to contain $\Delta^4$-androstene-3,17-dione in 95% yield.

*Examples XXXI–XXXIV*

The procedure employed in Example XXX was repeated in every detail in each of these examples with one exception, namely, N,N'-diisopropylcarbodiimide was replaced by N,N'-dimethylcarbodiimide, N,N'-dipropylcarbodiimide, N,N'-dibutylcarbodiimide and N,N'-di-p-tolylcarbodiimide, respectively. In each case, $\Delta^4$-androstene-3,17-dione was obtained.

*Example XXXV*

To a substantially anhydrous solution of 2 mmoles of cholan-24-al and 1 mmole of anhydrous phosphoric acid in 5 ml. of a mixture of dimethylsulfoxide and benzene in a volume ratio of 1:1, contained in a suitable reaction vessel, there were added 6 mmoles of N,N'-dicyclohexylcarbodiimide. The resulting reaction mixture was allowed to stand at room temperature overnight. Following this reaction period, the product was separated by chromatography on a silicic acid column, giving an 85% yield of chromatographically homogeneous cholan-24-al as the hydrate, melting point 95° C. from aqueous ethanol.

*Example XXXVI*

The procedure employed in Example XXXV was repeated in every detail except for the following. The alcohol starting material was 3β-acetoxy-19-hydroxy-$\Delta^5$-androsten-17-one, 0.5 molar equivalent (relative to this starting material) of pyridinium trifluoroacetate was used as the acid catalyst, and 5 ml. of dimethylsulfoxide were used as the sole solvent. After chromatography on a silicic acid column, a 53% yield of chromatographically pure 3β-acetoxy-$\Delta^5$-androsten-17-on-19-al (melting point 141–143° C.) was obtained by crystallization from a small volume of ethanol.

*Example XXXVII*

The procedure of Example XXXVI was again repeated exactly as given, but using 11α-hydroxyprogesterone as the alcohol starting material. After chromatography on a silicic acid column, a 68% yield of chromatographically pure 11-ketoprogesterone (melting point 175–177° C., cf. Peterson et al., J. Am. Chem. Soc., 74, 5933, 1952) was obtained.

*Example XXXVIII*

By again repeating the procedure of Example XXXVI in every detail, but using $\Delta^5$-androsten-3β-ol-17-one as the alcohol starting material, an 80–90% yield of $\Delta^5$-androstene-3,17-dione was obtained, as demonstrated by the appearance of an intense ultraviolet absorption at λmax. 240 mμ upon treatment of an aliquot portion of the ether extracted reaction mixture with ethereal hydrogen chloride. Before this acid treatment, only 10% of the ultimate ε240 was present. The unconjugated ($\Delta^5$) ketone was isolated in a pure form in 55% yield by direct crystallization from petroleum ether and then acetone as a white, crystalline powder which was homogeneous by thin layer chromatography, which showed it to be free from the isomeric $\Delta^4$-androstene-3,17-dione.

*Example XXXIX*

Two mmoles of testosterone were dissolved in a mixture of 5 ml. of dried dimethylsulfoxide, 2 mmoles of pyridine, 1 mmole of trifluoroacetic acid and 6 ml of a 1 M solution of N,N'-dicyclohexylcarbodiimide in dimethylsulfoxide : benzene (volume ratio 1:1). The resulting reaction mixture was allowed to stand overnight at room temperature, following which time thin layer chromatography showed that 100% conversion to $\Delta^4$-androstene-3,17-dione had taken place. Fifty ml. of diethyl ether were then added to the reaction mixture, followed by 6 mmoles of a concentrated solution of oxalic acid in methanol to destroy excess carbodiimide. Twenty minutes later, 50 ml. of water were added, the resulting mixture was well shaken, and dicyclohexyl urea was filtered off and washed with diethyl ether, the ether washings being returned to the ether layer. The ether layer was then extracted once with a 5% sodium bicarbonate solution and once with water, and was then dried with sodium sulfate and evaporated to dryness, leaving a crystalline residue. Direct crystallization of this residue from 5 ml. of hot ethanol gave 525 mg. (92% yield) of chromatographically pure $\Delta^4$-androstene-3,17-dione.

*Example XL*

A reaction mixture obtained by adding 0.5 mmole of substantially anhydrous N,N-dicyclohexylcarbodiimide to a substantially anhydrous solution of 0.1 mmole of of spegazzinidine dimethyl ether and 0.15 mmole of phosphoric acid in 0.25 ml. of dimethylsulfoxide, contained in a suitable reaction vessel, was maintained at room temperature for 18 hours. Following this reaction period, the dimethylsulfoxide was evaporated and, after the removal of unreacted N,N'-dicyclohexylcarbodiimide, an 80% yield of dehydrospegazzinidine dimethylether was obtained.

It will be obvious to those skilled in the art that other changes and variations can be made in carrying out the present invention without departing from the spirit and scope thereof as defined in the appended claims.

We claim:

1. A method of oxidizing primary and secondary alcohols to the corresponding aldehydes and ketones which comprises reacting, under substantially anhydrous conditions in a solvent comprising a liquid hydrocarbon sulfoxide and in the presence of an acid catalyst:
   (1) an alcohol selected from the group consisting of primary and secondary alcohols, with
   (2) an N,N'-di(hydrocarbon substituted)-carbodiimide.
2. A method according to claim 1 wherein said alcohol is a primary alcohol.
3. A method according to claim 1 wherein said alcohol is a steroidal primary alcohol.
4. A method according to claim 1 wherein said alcohol is an alkaloidal primary alcohol.
5. A method according to claim 1 wherein said alcohol is a nucleoside primary alcohol.
6. A method according to claim 1 wherein said alcohol is a secondary alcohol.
7. A method according to claim 1 wherein said alcohol is a steroidal secondary alcohol.
8. A method according to claim 1 wherein said alcohol is an alkaloidal secondary alcohol.
9. A method according to claim 1 wherein said N,N'-di(hydrocarbon substituted)carbodiimide is an N,N'-di(alkyl)carbodiimide.
10. A method according to claim 1 wherein said N,N'-di(hydrocarbon substituted)carbodiimide is an N,N'-diisopropylcarbodiimide.
11. A method according to claim 1 wherein said N,N'-di(hydrocarbon substituted)carbodiimide is an N,N'-di(cycloalkyl carbodiimide.
12. A method according to claim 1 wherein said N,N'-di(hydrocarbon substituted)carbodiimide is an N,N'-dicyclohexyl-carbodiimide.
13. A method according to claim 1 wherein said N,N'-di(hydrocarbon substituted)carbodiimide is an N-alkyl-N'-arylcarbodiimide.
14. A method according to claim 1 wherein said N,N'-di(hydrocarbon substituted)carbodiimide is N-(4-pyridylmethyl)-N'-cyclohexylcarbodiimide.
15. A method according to claim 1 wherein said liquid hydrocarbon sulfoxide is dimethylsulfoxide.
16. A method according to claim 1 wherein said acid catalyst is an oxyacid of phosphorus.
17. A method according to claim 1 wherein said acid catalyst is phosphoric acid.
18. A method according to claim 1 wherein said acid catalyst is phosphorous acid.
19. A method according to claim 1 wherein said acid catalyst is trifluoroacetic acid.
20. A method according to claim 1 wherein said acid catalyst is pyridinium trifluoroacetate.

References Cited by the Examiner

Pfitzner et al., JACS, vol. 85, Oct. 5, 1963, p. 3027.

LEWIS GOTTS, *Primary Examiner*.